United States Patent
Braun et al.

(10) Patent No.: US 6,622,708 B2
(45) Date of Patent: Sep. 23, 2003

(54) PRIMING FUEL SYSTEM METHOD AND APPARATUS FOR MARINE ENGINES

(75) Inventors: Charles W. Braun, Livonia, NY (US); Chris C. Begley, Ortonville, MI (US); Michael J. Niemiec, Brighton, MI (US)

(73) Assignee: Delphi Technologies, Inc., Troy, MI (US)

(*) Notice: Subject to any disclaimer, the term of this patent is extended or adjusted under 35 U.S.C. 154(b) by 150 days.

(21) Appl. No.: 09/879,468

(22) Filed: Jun. 12, 2001

(65) Prior Publication Data

US 2001/0039944 A1 Nov. 15, 2001

Related U.S. Application Data

(60) Provisional application No. 60/215,603, filed on Jun. 30, 2000.

(51) Int. Cl.[7] ............................ F02M 37/04; F02N 17/00
(52) U.S. Cl. .................. 123/516; 123/179.17; 123/510
(58) Field of Search .......................... 123/179.9, 179.12, 123/179.13, 179.16, 179.17, 461, 510, 516

(56) References Cited

U.S. PATENT DOCUMENTS 4,589,395 A * 5/1986 Timms et al. ............... 123/516
5,740,784 A * 4/1998 McKinney .............. 123/510 X
5,839,413 A * 11/1998 Krause et al. ...... 123/179.17 X
RE36,119 E * 3/1999 Kunishima et al. ......... 123/516

* cited by examiner

Primary Examiner—Tony M. Argenbright
(74) Attorney, Agent, or Firm—Patrick M. Griffin

(57) ABSTRACT

A fuel system for fluidly connecting a fuel tank with an engine includes a low-pressure fuel circuit connected to the fuel tank. A high-pressure fuel circuit connected to the engine is supplied with fuel by the low-pressure fuel circuit. A priming fuel circuit includes a priming fuel conduit and a priming valve. The priming fuel conduit has a first segment and a second segment. The priming valve has an inlet and an outlet. The first segment of the priming fuel circuit interconnects the low-pressure fuel circuit and the outlet of the priming valve. The second segment of the priming fuel circuit interconnects the high-pressure fuel circuit and the inlet of the priming valve. The priming valve is operable to control a flow of fluid through the priming fuel conduit to thereby selectively connect and disconnect the high-pressure fuel circuit and the low-pressure fuel circuit.

21 Claims, 3 Drawing Sheets

PRIMING FUEL SYSTEM METHOD AND APPARATUS FOR MARINE ENGINES

CROSS-REFERENCE TO RELATED APPLICATIONS

This application claims the benefit of U.S. Provisional Patent Application Serial No. 60/215,603, filed Jun. 30, 2000.

TECHNICAL FIELD

The present invention relates generally to fuel systems, and, more particularly, to an apparatus and method for priming fuel systems of marine engines.

BACKGROUND OF THE INVENTION

Many fuel systems, such as those found on electronically fuel-injected motors for use with marine vehicles, include a low-pressure fuel circuit and a high-pressure fuel circuit. The low-pressure fuel circuit typically includes an engine driven suction or lift pump that pulls fuel through a low-pressure fuel line connecting the vehicle fuel tank to an engine-mounted vapor separator. The vapor separator includes a float-activated needle and seat to control fuel depth within the vapor separator, and an electric fuel pump to increase the fuel pressure to the operating pressure of the high-pressure system, i.e., the electronic fuel injection system.

One of the purposes of such a dual-pressure system is to minimize the amount or length of on-board fuel line containing fuel at high pressure. A leak in the low-pressure line pulls air into the fuel line. In contrast, a leak in the high-pressure fuel line forces or leaks fuel out of the fuel line. Thus, by limiting the amount or length of high-pressure fuel line, the potential for undesirable accumulation of leaked fuel is reduced. Therefore, attempts are made to limit the length and position of the high-pressure fuel line. On outboard engines, the high-pressure fuel lines are typically restricted to the engine itself. Thus, any leaks from the high-pressure fuel line are likely to be contained under the cover or cowl of the engine. The leaked fuel will eventually drain into the body of water, a condition that, although perhaps undesirable, is far less dangerous than the leaked fuel accumulating in the marine vehicle itself. Similarly, on marine vehicles with inboard engines the use of high-pressure fuel lines is restricted to the engine compartment thereby limiting the accumulation of leaked fuel to the engine compartment.

A drawback to such dual-pressure systems is that heat rejection from the high-pressure fuel pump and the engine itself can cause the boiling and/or vaporization of the liquid fuel in the vapor separator, low-pressure lift pump and low-pressure fuel lines. This impedes fuel delivery to the high-pressure fuel pump, and can thereby cause rough engine operation and/or stalling. Therefore, dual-pressure systems generally require an additional cooling system that cools the vapor separator and/or high-pressure return fuel line, typically with cooling water drawn from the body of water.

The additional cooling system must draw power from either the engine or battery in order to operate, and is thus typically operated only during engine operation. Such a cooling system does not prevent the fuel from vaporizing during a hot soak condition, i.e., the time following engine shut-off and before the engine and high-pressure fuel pump have cooled down. During a hot soak, at least some of the heat dissipating from the engine and high-pressure fuel pump is absorbed by the low-pressure fuel remaining in the vapor separator, low-pressure lift pump and low-pressure fuel lines. This absorbed heat can cause vaporization of the low-pressure fuel. The vaporized fuel, in turn, pushes any liquid fuel remaining in the vapor separator and low-pressure fuel lines back into the fuel tank.

Restarting the engine from a hot soak condition, i.e., a hot restart, can result in stalling or rough engine operation if the liquid fuel remaining in the high-pressure fuel line is consumed before the low-pressure lift pump is able to refill the low-pressure fuel line and the vapor separator with liquid fuel. Some fuel systems incorporate a check valve between the lift pump and the fuel tank to reduce the amount of fuel that is pushed back to the fuel tank. However, vaporization of the fuel remaining in the low-pressure fuel line may still occur, and fuel between the check valve and fuel tank may run back to the fuel tank. In order to avoid stalling and/or rough engine operation upon hot restart, the lift pump must replace the volume lost due to the hot soak condition before the liquid fuel remaining in the high-pressure fuel line and vapor separator is consumed.

Therefore, what is needed in the art is an apparatus that reduces the need for a cooling system for the vapor separator and/or high-pressure return fuel line.

Furthermore, what is needed in the art is an apparatus that reduces stalling and/or rough engine operation on hot restart.

SUMMARY OF THE INVENTION

The present invention provides a fuel system for fluidly connecting a fuel tank with an engine.

The invention comprises, in one form thereof, a low-pressure fuel circuit fluidly connected to the fuel tank. A high-pressure fuel circuit is supplied with fuel by the low-pressure fuel circuit, and is fluidly connected to the engine. A priming fuel circuit includes a priming fuel conduit and a priming valve. The priming fuel conduit has a first segment and a second segment. The priming valve has an inlet and an outlet. The first segment of the priming fuel circuit fluidly interconnects the low-pressure fuel circuit and the outlet of the priming valve. The second segment of the priming fuel circuit fluidly interconnects the high-pressure fuel circuit and the inlet of the priming valve. The priming valve is operable to control a flow of fluid through the priming fuel conduit to thereby selectively fluidly connect and disconnect the high-pressure fuel circuit and the low-pressure fuel circuit.

An advantage of the present invention is that the cooling system for the vapor separator and/or high-pressure return fuel line can be of a reduced capacity or be completely eliminated.

Another advantage of the present invention is that stalling and/or rough engine operation during hot restart is reduced.

BRIEF DESCRIPTION OF THE DRAWINGS

The above-mentioned and other features and advantages of this invention, and the manner of attaining them, will become apparent and be better understood by reference to the following description of one embodiment of the invention in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DESCRIPTION OF THE PREFERRED EMBODIMENTS

Figure 1:
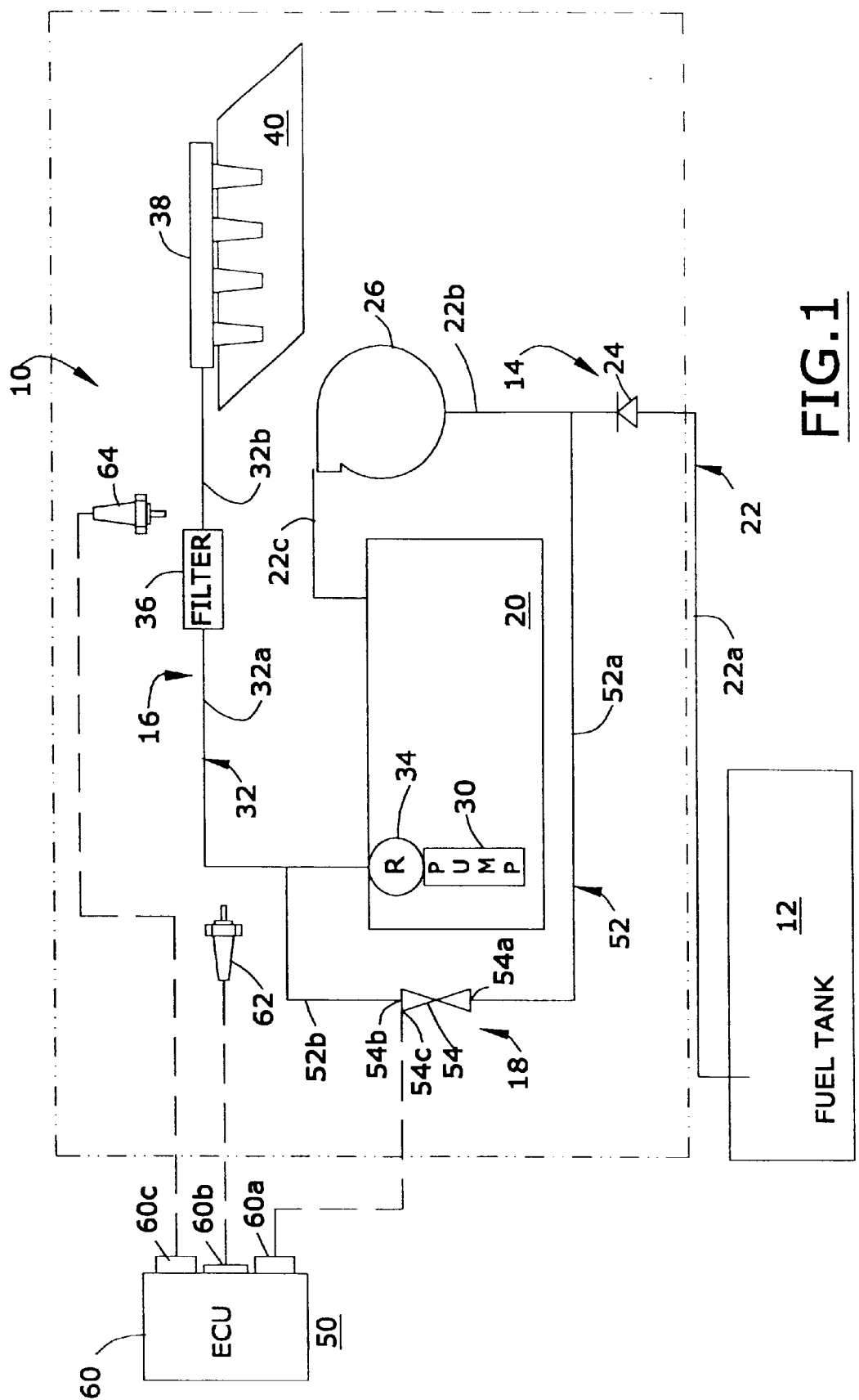
FIG. 1 is a schematic diagram of one embodiment of a priming fuel system of the present invention.

Referring now to the drawings, and particularly to FIG. 1, there is shown one embodiment of a priming fuel system of the present invention. Fuel system 10 is for use in a dual-pressure fuel system, such as, for example, those typically used in conjunction with marine engines. Fuel system 10 includes fuel tank 12, low-pressure fuel circuit 14, high-pressure fuel circuit 16, priming fuel circuit 18, and vapor separator 20.

Low-pressure fuel circuit 14 includes low-pressure fuel line 22, check valve 24 and lift pump 26. Low-pressure fuel circuit 14 fluidly connects fuel tank 12 to vapor separator 20. More particularly, first segment 22a of low-pressure fuel line 22 fluidly connects fuel tank 12 to check valve 24, second segment 22b of low-pressure fuel line 22 fluidly connects check valve 24 to lift pump 26, and third segment 22c of low-pressure fuel line 22 fluidly connects lift pump 26 to vapor separator 20. Check valve 24, such as, for example, a conventional check valve preferably having a low flow restriction, is disposed intermediate fuel tank 12 and lift pump 26, and is operable to control the flow of fuel through low-pressure fuel line 22.

High-pressure fuel circuit 16 includes high-pressure fuel pump 30, high-pressure fuel line 32, pressure regulator 34, fuel filter 36 and fuel rail 38. High-pressure fuel circuit 16 fluidly interconnects vapor separator 20 with fuel rail 38, which, in turn, is fluidly connected with and supplies fuel to one or more fuel injectors (not shown) of engine 40, such as, for example, a marine inboard or outboard motor. Pressure regulator 34 controls the flow of fluid from high-pressure fuel pump 30 to high-pressure fuel line 32 dependent at least in part upon the fuel pressure within high-pressure fuel line 32. Pressure regulator 34 is, for example, a conventional bypass regulator that diverts fuel in excess of the mass required to maintain fuel pressure back into vapor separator 20. A first segment 32a of high-pressure fuel line 32 fluidly connects pressure regulator 34 with fuel filter 36, and a second segment 32b fluidly connects fuel filter 36 with fuel rail 38.

Priming fuel circuit 18 includes priming fuel conduit 52 and priming valve 54. Priming valve 54 is, for example, a conventional electronically/solenoid controlled check valve, and includes first/outlet side 54a, second/inlet side 54b and input 54c. As will be more particularly described hereinafter, priming valve 54 selectively controls the flow of fluid through priming fuel circuit 18 from high-pressure fuel circuit 16 into low-pressure fuel circuit 14. A first segment 52a of priming fuel conduit 52 fluidly connects low-pressure fuel circuit 14 with first/outlet side 54a of priming valve 54. Second segment 52b of priming fuel conduit 52 fluidly connects a second/inlet side 54b of priming valve 54 with high-pressure fuel circuit 16. More particularly, first segment 52a of priming fuel conduit 52 is fluidly connected to second segment 22b of low-pressure fuel line 22, i.e., between check valve 24 and lift pump 26. Second segment 52b of priming fuel conduit 52 is fluidly connected to first segment 32a of high-pressure fuel conduit 32, i.e., between pressure regulator 34 and fuel filter 36. As will be described more particularly hereinafter, priming valve 54 is operable to selectively control the flow of fluid from inlet 54b to outlet 54a thereof, and, thus, controls the flow of fluid through priming fuel circuit 18 from high-pressure circuit 16 to low-pressure fuel circuit 14.

Vapor separator 20 is a conventional vapor separator that includes a float-activated needle and seat (not shown) that control the liquid level of the fuel contained therein. An inlet (not referenced) of vapor separator 20 is fluidly connected to third segment 22c of low-pressure fuel line 22, and an outlet (not referenced) of vapor separator 20 is fluidly connected to first segment 32a of high-pressure fuel line 32. In the embodiment shown, pressure regulator 34 and high-pressure pump 30 are integral with and/or contained within vapor separator 20. Thus, the outlet of vapor separator 20 is functionally equivalent to the outlet of high-pressure fuel pump 30 and/or pressure regulator 34.

When a hot restart is attempted in a conventional dual-pressure fuel system without the benefit of sufficient cool down time, the engine may be difficult to start, may stall and/or operate roughly. This is due to heat dissipating from the engine and being absorbed into the low-pressure liquid fuel remaining within the low-pressure fuel circuit. The heat may cause vaporization of the liquid fuel within the low-pressure fuel circuit. The fuel vapor displaces any liquid fuel remaining in the low-pressure fuel circuit back into the fuel tank. Upon restart, the low-pressure lift fuel pump must refill the low-pressure fuel circuit with liquid fuel. The low-pressure fuel circuit, however, remains hot. Thus fuel being drawn into the low-pressure fuel circuit can flash from liquid fuel to fuel vapor, expand in volume, and may push the liquid fuel entering the low-pressure fuel circuit back toward the fuel tank. The conversion of the liquid fuel entering the low-pressure fuel circuit into vapor removes some of the heat. This vaporization-heat removal process continues until the low-pressure fuel circuit and the fuel contained therein are sufficiently cooled to stop the vapor generation, or until the fuel within the vapor separator is consumed by the engine. If the engine consumes the fuel within the vapor separator before the low-pressure circuit is sufficiently cooled, rough engine operation, stalling and/or difficulty in starting the engine may result.

In use, and as more particularly described hereinafter, fuel system 10 compares certain parameters of engine 40 against predetermined thresholds and determines whether priming of low-pressure fuel circuit 14 is necessary at start-up of engine 40. If priming is necessary, priming valve 54 is activated to fluidly connect high-pressure fuel circuit 16 via priming circuit 18 to low-pressure circuit 14 at a point between check valve 24 and lift pump 26. Liquid fuel is pumped from high-pressure fuel circuit 16 through priming fuel circuit 18 and delivered to the inlet side of lift pump 26 of low-pressure fuel circuit 14, i.e., second segment 22b of low-pressure fuel line 22. As a result, lift pump 26 pumps more efficiently, i.e., pumps a higher mass of fuel with each stroke. Further, the additional mass of liquid fuel increases the heat capacity of low-pressure circuit 14, which is therefore able to absorb heat at a faster rate. Even further, the additional mass of liquid fuel increases the fuel pressure thereby suppressing vapor within low-pressure circuit 14. Moreover, the fuel that remains in vapor separator 20 weathers during the hot soak, and therefore has a higher boiling point than the fuel in fuel tank 12 and, thus, vaporizes less readily.

The priming of low-pressure fuel circuit 14 is controlled by priming valve 54, which, in turn, is controlled by Engine Control Unit (ECU) 60. ECU 60 is a conventional engine control unit that includes, for example, a 32-bit microprocessor, random access memory, read only memory, and input/output interface circuitry. ECU 60 includes priming valve control output 60a, coolant temperature input 60b and manifold air temperature input 60c. Priming valve control output 60a is electrically connected with priming valve 54. Priming valve control output 60a controls priming valve 54, i.e., opens and closes priming valve 54, to connect and disconnect low-pressure fuel circuit 14 and high-pressure fuel circuit 16, respectively. Coolant temperature input 60b is electrically connected to coolant temperature sensor 62, which is in fluid communication with the coolant of engine 50 and which senses the temperature of the coolant of engine 50. Manifold air temperature input 60c is electrically connected to manifold air temperature sensor 64, which senses the manifold air temperature. Each of coolant temperature sensor 62 and manifold air temperature sensor 64 is, for example, a conventional electronic or electromechanical sensor that issues an electrical signal indicative of coolant temperature ($T_c$) and manifold air temperature ($T_l$), respectively.

Figure 2:
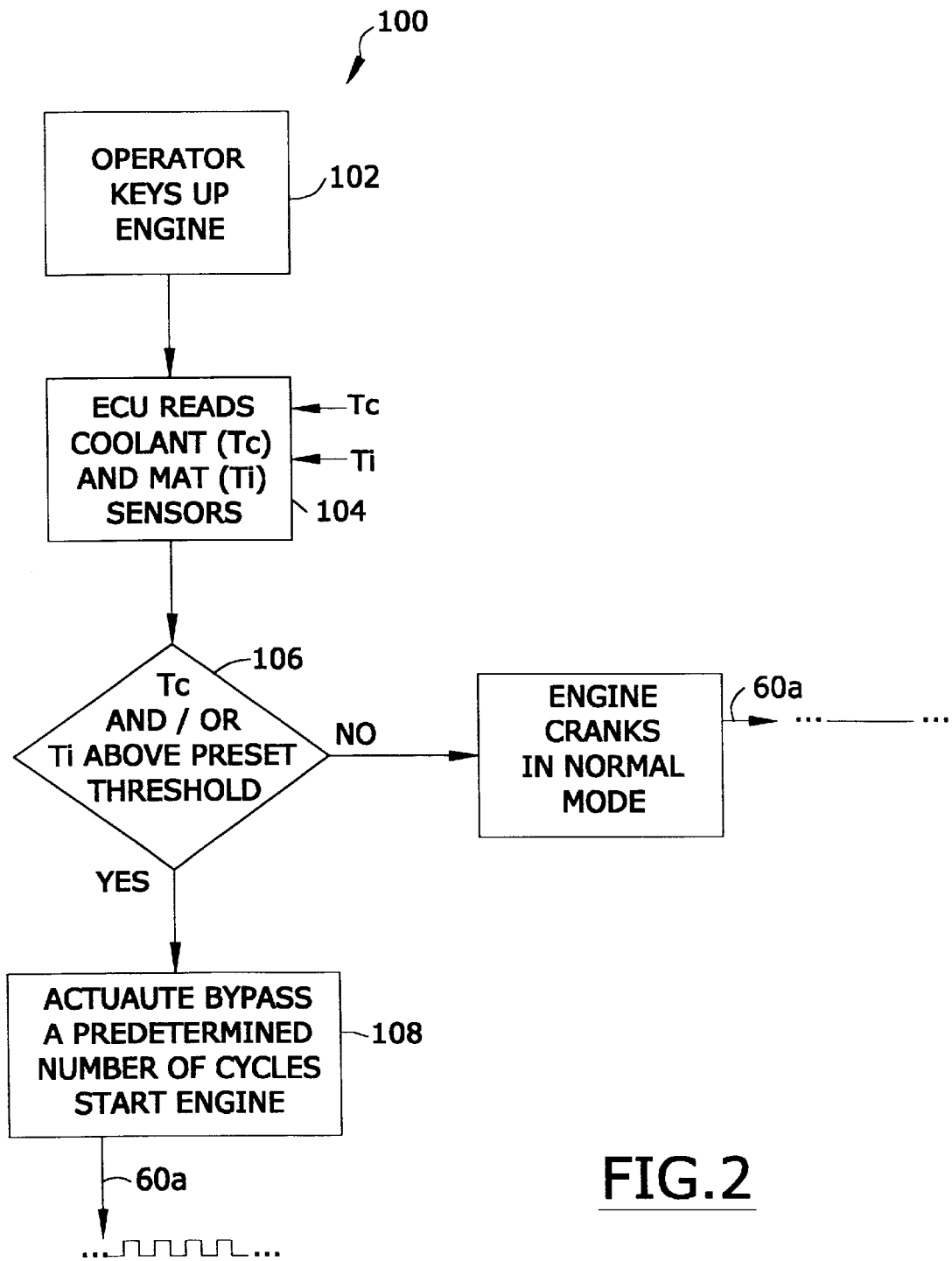
FIG. 2 is a flow chart of the method of the present invention.

Referring now to FIG. 2, ECU 60 is programmed to execute priming method 100. Priming method 100 executes initialization step 102 at engine key-up or start-up. ECU 60 initializes itself and various systems of engine 50, such as, for example, fuel system 10, during initialization step 102. ECU 60 then executes reading step 104, where at least one of coolant temperature sensor 62 and manifold air temperature sensor 64 is read by a respective one of coolant temperature input 60b and manifold air temperature input 60c. More particularly, ECU 60 reads the electrical signal issued by temperature sensor 62 and/or manifold air temperature sensor 64 indicative of $T_c$ and $T_l$, respectively. Comparing step 106 is then performed by ECU 60.

Comparing step 106 compares the sensed values of $T_c$ and/or $T_l$ with corresponding predetermined threshold values for $T_c$ and/or $T_l$. If the sensed values of $T_c$ and/or $T_l$ exceed the corresponding threshold values priming valve 54 is activated. The threshold value for $T_c$ and $T_l$ are, for example, greater than from approximately 40 degrees Celsius to greater than approximately 100 degrees for $T_c$, and greater than approximately 40 degrees Celsius to greater than approximately 75 degrees Celsius for $T_l$.

Priming step 108 activates priming valve 54. Input 54c of priming valve 54 is electrically connected to priming valve control output 60a of ECU 60. Thus, the electrical signal on valve control output 60a controls the flow of fluid through priming valve 54. Priming valve 54 is closed when a corresponding electrical signal, such as, for example, a signal at approximately ground potential or a conventional logic-low voltage level, is issued by ECU 60 on priming valve control output 60a. Similarly, priming valve 54 is opened when a corresponding electrical signal, such as, for example, a conventional logic-high voltage level, is issued by ECU 60 on priming valve control output 60a. During priming step 108, ECU 60 issues on priming valve control output 60a a predetermined number of appropriate pulses to thereby activate, i.e., open, priming valve 54. Thus, a predetermined amount of fuel passes from high-pressure fuel circuit 16, through priming fuel circuit 18, and into low-pressure fuel circuit 14. More particularly, liquid fuel is supplied to or injected by priming valve 54 into first segment 52a of priming fuel conduit 52 and into second segment 22b of low-pressure fuel conduit 22.

The fuel supplied to second segment 22b of low-pressure fuel conduit 22 within low-pressure fuel circuit 14 supplies lift pump 26 with liquid fuel, thereby enabling lift pump 26 to pump more efficiently, i.e., pump a higher mass of fuel with each stroke. Further, the additional mass of liquid fuel increases the heat capacity of low-pressure circuit 14, which is therefore able to absorb heat at a faster rate. Even further, the additional mass of liquid fuel increases the fuel pressure thereby suppressing vapor within low-pressure circuit 14.

Figure 3:
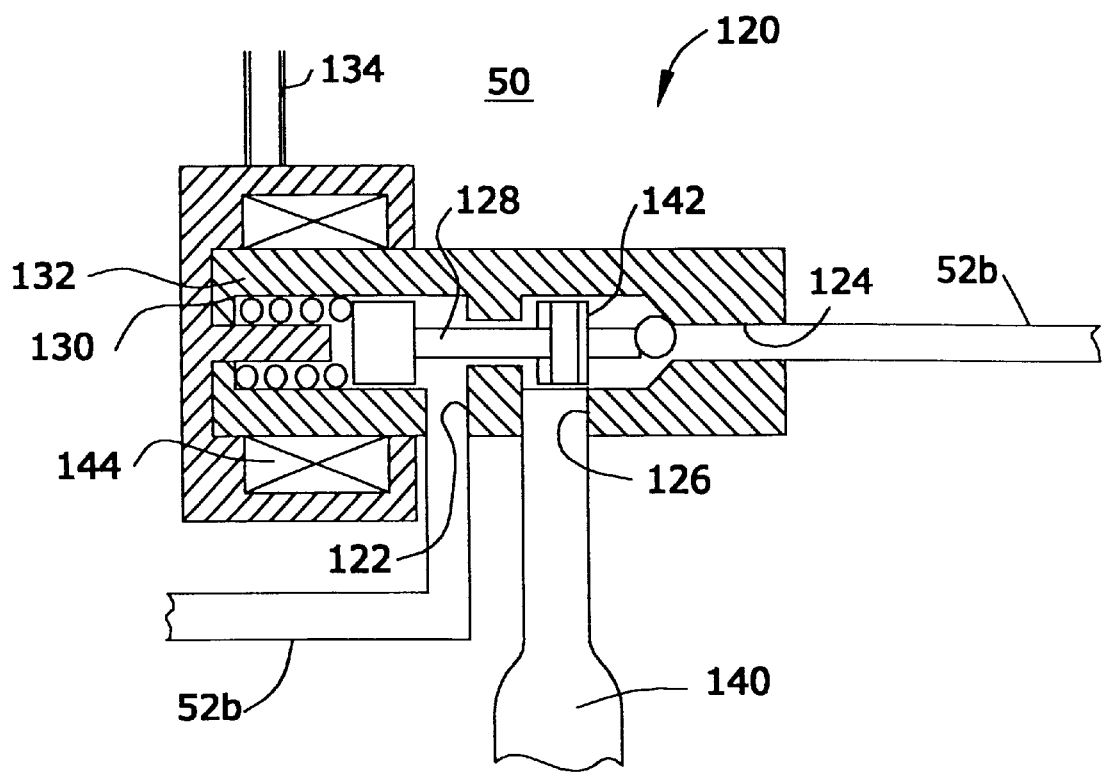
FIG. 3 is a schematic diagram of a second embodiment of a priming fuel system of the present invention incorporating a flow control device and accumulating device.

Referring now to FIG. 3, flow control device 120 is optionally fluidly connected to second segment 52b of priming fuel conduit 52, and includes flow-restricting orifice 122, low-pressure orifice 124, accumulator orifice 126, armature 128, spring 130, and solenoid 132. Flow control device 120 is especially suited for use in relatively "stiff" fuel systems, such as, for example, a fuel system having fuel conduits constructed of relatively rigid or stiff material, such as, for example, aluminum or steel tubing.

Generally, flow control device 120 selectively fluidly connects and disconnects accumulating device 140 with each of flow-restricting orifice 122 and low-pressure orifice 124. More particularly, with armature 128 in a first or open position, flow control device 120 fluidly connects accumulating orifice 126 with low-pressure orifice 124 thereby connecting accumulating device 140 with second segment 52b of priming fuel conduit 52 and, thus, with low-pressure fuel circuit 14. In the first position, flow control device 120 via armature 128 fluidly disconnects flow-restricting orifice 122 from accumulating device 140. With armature 128 in a second or closed position, flow control device 120 fluidly connects accumulating device 140 with flow-restricting orifice 122, and contemporaneously fluidly disconnects accumulating device 140 from low-pressure orifice 124. Thus, with armature 128 in the second position, accumulating device 140 fills with pressurized fuel though flow-restricting orifice 122.

Flow control device 120 is disposed in series with second segment 52b of priming fuel conduit 52. More particularly, flow-restricting orifice 122 is fluidly connected to second segment 52b of priming fuel conduit 52, and low-pressure orifice 124 is fluidly connected to second segment 52b of priming fuel conduit 52 at a point downstream from flow-restricting orifice 122. Accumulating orifice 126 is fluidly connected to accumulating device 140.

Flow-restricting orifice 122 restricts the rate of fuel flow into accumulating device 140. Thus, accumulating device 140 fills with high-pressure fuel at a relatively slow, or reduced, rate relative to the rate at which accumulating device 140 would fill if fed by an unrestricted high-pressure fuel flow. Flow-restricting orifice 122 restricts flow by, for example, having a reduced diameter, such as, for example, ten-thousandths (0.010) of an inch.

Armature 128 is selectively placed into one of the first and second positions, as described above, through the selective energizing and de-energizing of solenoid 132 by ECU 60. Solenoid 132 is electrically connected to ECU 60 by wires 134. Armature 128 carries sealing member 142. With armature 128 in the second or closed position, sealing member 142 is disposed in sealing engagement with low-pressure orifice 124, to thereby fluidly isolate low-pressure orifice 124 from accumulating device 140 and fluidly connect accumulating device 140 with high-pressure orifice 122. Thus, accumulating device 140 is allowed to fill with pressurized fuel. With armature 128 in the first or open position, sealing member 142 is disposed in sealing engagement with high-pressure orifice 122, thereby fluidly isolating high-pressure orifice 122 from accumulating device 140 and fluidly connecting accumulating device 140 with low-pressure orifice 124. Thus, pressurized fuel is permitted to flow from accumulating device 140 through fuel priming conduit 52 and into second segment 22b of low pressure fuel circuit 14.

The operation of flow control device 120 is controlled by ECU 60, or an ignition switch (not shown) to which it is electrically interconnected. ECU 60 selectively energizes and de-energizes coil 144 which is associated with armature 128, and, in turn, carries sealing member 142 into and/or out of engagement with one of high-pressure orifice 122 and low-pressure orifice 124. Alternatively, actuation of the ignition switch energizes coil 144 for a fixed period of time during each engine start cycle.

In the embodiment shown, coolant temperature sensor 62 and manifold air temperature sensor 64 are each read by ECU 60, and priming valve 54 is activated dependent at least in part upon the indications of $T_c$ and $T_I$ obtained therefrom. However, it is to be understood that the operation of the priming valve can be dependent at least in part upon a single sensor used to sense one of manifold air temperature and coolant temperature.

Further, the present invention can be alternately configured to activate the priming valve automatically, regardless of manifold air and coolant temperature. In such an embodiment, the addition of a fuel accumulation device or means 140, such as, for example, a spring diaphragm or a canister, may be required. Further, such an embodiment is compatible for engines and/or marine vehicles that do not include an ECU.

In the embodiment shown, high-pressure fuel pump 30 and pressure regulator 34 are disposed within, or integrated with, vapor separator 20. However, it is to be understood that the high-pressure fuel pump and the pressure regulator can be alternately configured, such as, for example, separate components disposed externally of the vapor separator.

In the embodiment shown, ECU 60 compares, in comparing step 100, $T_c$ and/or $T_I$ with predetermined threshold values. If priming is required, ECU 60 issues a predetermined number of pulses on priming valve control output 60a. However, it is to be understood that the method of the present invention can be alternately configured, such as, for example, conducting the added step of determining the amount of fuel to route from the high-pressure circuit to the low-pressure circuit. In such an embodiment, ECU 60 references a look-up table or other cross-reference table stored in random access or read-only memory of ECU 60. The look-up table provides the number of electrical pulses to be output on priming valve control output 60a for a range of values of $T_c$ and/or $T_I$.

While this invention has been described as having a preferred design, the present invention can be further modified within the spirit and scope of this disclosure. This application is therefore intended to cover any variations, uses, or adaptations of the present invention using the general principles disclosed herein. Further, this application is intended to cover such departures from the present disclosure as come within the known or customary practice in the art to which this invention pertains and which fall within the limits of the appended claims.

What is claimed:

1. A fuel system for fluidly connecting a fuel tank with an engine, comprising:
    a low-pressure fuel circuit configured for being fluidly connected to said fuel tank;
    a high-pressure fuel circuit configured for being fluidly connected to said engine, said high-pressure fuel circuit being supplied with fuel by said low-pressure fuel circuit; and
    a priming fuel circuit having a priming fuel conduit and priming valve means, said priming fuel conduit having a first segment and a second segment, said priming valve means having an inlet and an outlet, said first segment fluidly interconnecting said low-pressure fuel circuit and said outlet, said second segment fluidly interconnecting said high-pressure fuel circuit and said inlet, said priming valve means being operable to control a flow of fluid through said priming fuel conduit to thereby selectively fluidly connect and disconnect said high-pressure fuel circuit and said low-pressure fuel circuit.

2. The fuel system of claim 1, wherein said priming valve means comprises an electronically controlled fluid control valve.

3. The fuel system of claim 2, wherein said electronically controlled fluid control valve comprises a solenoid-operated fluid control valve.

4. The fuel system of claim 1, said low-pressure fuel circuit comprising:
    a low-pressure fuel pump;
    a low-pressure fuel conduit having a first end fluidly connected to said low-pressure fuel pump and a second end configured for being fluidly connected to said fuel tank; and
    a vapor separator fluidly interconnected with said low-pressure fuel pump.

5. The fuel system of claim 1, said low-pressure fuel circuit comprising:
    a low-pressure fuel conduit having first, second and third low-pressure segments, each of said first, second and third low-pressure segments having respective first and second ends, said first end of said first low-pressure segment configured for being fluidly connected to said fuel tank;
    a check valve having an inlet side and an outlet side, said inlet side fluidly connected to said second end of said first low-pressure segment, said outlet side connected to said first end of said second low-pressure segment;
    a lift pump having an inlet and an outlet, said inlet fluidly connected to said second end of said second low-pressure segment, said outlet fluidly connected to said first end of said third low-pressure segment; and
    a vapor separator having an inlet and an outlet, said inlet fluidly connected to said second end of said third low-pressure segment.

6. The fuel system of claim 5, wherein said first segment of said priming fuel conduit is fluidly connected to said second segment of said low-pressure fuel conduit to thereby fluidly interconnect said low-pressure fuel circuit and said outlet of said priming valve means.

7. The fuel system of claim 1, said high-pressure fuel circuit comprising:
    a high-pressure fuel pump in fluid communication with said low-pressure fuel circuit; and
    a high-pressure fuel conduit having a first end fluidly connected to said high-pressure fuel pump and a second end configured for being fluidly connected to said engine.

8. The fuel system of claim 1, said high-pressure fuel circuit comprising:

a high-pressure fuel conduit having first and second high-pressure segments, each of said first and second high-pressure segments having respective first and second ends, said second end of said second high-pressure segment being configured for being fluidly connected to the engine;

a high-pressure fuel pump in fluid communication with said low-pressure fuel circuit, said first end of said first high-pressure segment being fluidly connected to said high-pressure fuel pump; and a fuel filter fluidly connected to said second end of said first high-pressure segment and to said first end of said second high-pressure segment.

9. The fuel system of claim 8, further comprising a pressure regulator in fluid communication with said high-pressure fuel pump.

10. The fuel system of claim 8, wherein said second segment of said priming fuel conduit is fluidly connected to said first high-pressure segment to thereby fluidly interconnect said high-pressure fuel circuit and said inlet of said priming valve means.

11. The fuel system of claim 1, wherein said priming valve means includes a control input for selectively controlling the flow of fluid through said priming valve means.

12. The fuel system of claim 11, wherein said control input is configured for being electrically connected to a control output of an engine control module.

13. The fuel system of claim 1, further comprising at least one sensor, each said at least one sensor issuing a respective output signal, said priming valve means controlling the flow of fluid through said priming fuel circuit based at least in part upon said output signal to thereby fluidly connect and disconnect said high-pressure fuel circuit and said low-pressure fuel circuit.

14. The fuel system of claim 13, wherein said at least one sensor comprises at least one of a coolant temperature sensor and a manifold air temperature sensor.

15. The fuel system of claim 13, wherein said at least one sensor comprises at least one of a coolant temperature sensor and at least one of a manifold air temperature sensor.

16. The fuel system of claim 1, further comprising:

an accumulating device;

a fluid control means selectively fluidly connecting said accumulating device to a selected one of said high-pressure fuel circuit and said low-pressure fuel circuit and disconnecting said accumulating device from the other of said selected one of said high-pressure fuel circuit and said low-pressure fuel circuit.

17. The fuel system of claim 16, wherein said fluid control means comprises a solenoid-actuated fluid control valve, said fluid control valve configured for being electrically connected to at least one of an engine control module and an ignition switch.

18. The fuel system of claim 16, wherein said fluid control means is disposed in fluid communication with said priming fuel circuit and controls a flow of fluid from said priming fuel circuit into said accumulating device.

19. A marine vehicle, comprising:

a fuel tank;

an engine; and a fuel system fluidly interconnecting said engine and said fuel tank, said fuel system comprising:

a low-pressure fuel circuit fluidly connected to said fuel tank;

a high-pressure fuel circuit fluidly connected to said engine, said high-pressure fuel circuit being supplied with fuel by said low-pressure fuel circuit; and a priming fuel circuit having a priming fuel conduit and priming valve means, said priming fuel conduit having a first segment and a second segment, said priming valve means having an inlet and an outlet, said first segment fluidly interconnecting said low-pressure fuel circuit and said outlet, said second segment fluidly interconnecting said high-pressure fuel circuit and said inlet, said priming valve means being operable to control a flow of fluid through said priming fuel conduit to thereby selectively fluidly connect and disconnect said high-pressure fuel circuit and said low-pressure fuel circuit.

20. A method of priming a fuel system, said fuel system having a low-pressure fuel circuit fluidly interconnected with a fuel tank, and a high-pressure fuel circuit fluidly interconnected with an engine, the high-pressure fuel circuit being supplied with fuel by the low-pressure fuel circuit, said method comprising the steps of:

providing a fuel priming circuit, said fuel priming circuit in fluid communication with each of the low-pressure fuel circuit and the high-pressure fuel circuit; and controlling a flow of fuel through said fuel priming circuit from said high-pressure circuit to said low-pressure circuit with an electronically-controlled priming valve means to thereby selectively interconnect the high-pressure fuel circuit with the low-pressure fuel circuit.

21. The method of claim 20, wherein said controlling step comprises:

sensing at least one of a coolant temperature and a manifold air temperature;

comparing said at least one of a coolant temperature and a manifold temperature with respective predetermined thresholds; and issuing a control signal to actuate said priming valve means, said control signal dependent at least in part upon said comparing step.

* * * * *